(12) United States Patent
Siegel et al.

(10) Patent No.: US 10,015,201 B2
(45) Date of Patent: Jul. 3, 2018

(54) IMPLEMENTING APPLICATION LEVEL MULTIMEDIA SERVICES AS A SWITCHING FUNCTION

(71) Applicant: AT&T Intellectual Property I, L.P., Atlanta, GA (US)

(72) Inventors: Steven A. Siegel, Mendham, NJ (US); Thomas J. Will, Skillman, NJ (US); Larry B. Pearson, San Antonio, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 342 days.

(21) Appl. No.: 14/755,812

(22) Filed: Jun. 30, 2015

(65) Prior Publication Data

US 2017/0006134 A1  Jan. 5, 2017

(51) Int. Cl.
*G06F 15/16* (2006.01)
*H04L 29/06* (2006.01)

(52) U.S. Cl.
CPC ................ *H04L 65/1006* (2013.01)

(58) Field of Classification Search
CPC .................................................. H04L 65/1006
See application file for complete search history.

(56) References Cited

U.S. PATENT DOCUMENTS

| | | |
|---|---|---|
| 7,664,102 B1 | 2/2010 | Samarasinghe |
| 8,072,970 B2 | 12/2011 | Ricciardi et al. |
| 8,102,840 B2 | 1/2012 | Kittredge et al. |
| 8,165,113 B1 | 4/2012 | Peters et al. |
| 8,392,581 B2 | 3/2013 | Ait-ameur et al. |
| 8,503,361 B2 | 8/2013 | Bienas et al. |
| 8,533,340 B2 | 9/2013 | Ratcliffe et al. |
| 8,544,080 B2 | 9/2013 | Arauz |
| 8,644,222 B2 | 2/2014 | Schmidt et al. |
| 8,989,000 B2 | 3/2015 | Draznin et al. |

(Continued)

FOREIGN PATENT DOCUMENTS

| | | |
|---|---|---|
| EP | 2549711 A1 | 1/2013 |
| WO | 2013132560 A1 | 9/2013 |

OTHER PUBLICATIONS

"AT&T, Ericsson virtualise IMS CSCF on OpenStack," BCN: Business Cloud News, businesscloudnews.com, http://www.businesscloudnews.com/2014/11/03/att-ericsson-virtualise-ims-cscf-on-openstack/ Nov. 3, 2014.

(Continued)

*Primary Examiner* — Michael A Keller

(57) ABSTRACT

A network for delivering application level multimedia services includes simple, application-level switches and rules managers. Each application-level switch includes rules defining message edits and selections of message destinations. The rules managers operate to manage the rules. Network functions process messages on the application level, and include operation of one or more rules managers and operation of an application-level switch. The network function is performed by the switch application by performing application level message processing according to rules managed by the at least one of the plurality of rules managers. The application level switches together resolve a requested identity to one or more routable addresses, enabling the network to route a message.

20 Claims, 13 Drawing Sheets

(56) References Cited

U.S. PATENT DOCUMENTS

| | | | |
|---|---|---|---|
| 2004/0028080 A1 | 2/2004 | Samarasinghe et al. | |
| 2005/0138197 A1* | 6/2005 | Venables | H04L 47/10 709/232 |
| 2008/0080508 A1* | 4/2008 | Das | H04L 12/4633 370/392 |
| 2008/0144494 A1 | 6/2008 | Casey | |
| 2009/0097466 A1* | 4/2009 | Lee | H04L 1/0081 370/344 |
| 2010/9019043 | 7/2010 | Huang et al. | |
| 2011/0119312 A1* | 5/2011 | Chopra | G06F 17/30557 707/802 |
| 2012/0177193 A1* | 7/2012 | Keller | H04W 76/02 379/211.01 |
| 2012/0190325 A1* | 7/2012 | Abu-Hakima | H04L 12/1845 455/404.2 |
| 2013/0124712 A1 | 5/2013 | Parker | |
| 2013/0291036 A1 | 10/2013 | Yamagishi | |
| 2014/0086177 A1 | 3/2014 | Adjakple et al. | |
| 2014/0153443 A1 | 6/2014 | Carter et al. | |
| 2014/0229945 A1 | 8/2014 | Barkai et al. | |
| 2014/0269510 A1 | 9/2014 | Xu et al. | |
| 2014/0344913 A1 | 11/2014 | Stahl | |
| 2015/0023146 A1* | 1/2015 | Suzuki | H04L 45/28 370/216 |
| 2015/0358248 A1* | 12/2015 | Saha | H04L 43/0817 709/226 |
| 2016/0021032 A1* | 1/2016 | Maier | H04L 49/70 370/401 |
| 2016/0149861 A1* | 5/2016 | Batke | H04L 63/02 726/13 |

OTHER PUBLICATIONS

"Mavenir Systems Introduces the SDN EPC," Mavenir: Transforming Mobile Networks, mavenir.com, http://mavenir.com/about-us/news-and-events/press-releases/press-releases-details/2015/Mavenir-Systems-Introduces-the-SDN-EPC/default.aspx Feb. 24, 2015.

"[NWTF203] Exploring Network Functions Virtualization (NFV)," Award Solutions, awardsolutions.com, http://www.awardsolutions.com/forms/trainingSolutions.aspx?viewCourse=296 accessed on Web Apr. 2015.

Paolini, Monica, Metaswitch: Bringing NFV to the IMS core, www.senzafiliconsulting.com, http://www.senzafiliconsulting.com/Blog/tabid/64/articleType/ArticleView/articleId/201/Metaswitch-Bringing-NFV-to-the-IMS-core.aspx Sep. 15, 2014.

"Network Functions Virtualization," Metaswitch, info.metaswitch.com http://info.metaswitch.com/network-functions-virtualization-nfv?source=web-takeover-1 Accessed on Web Apr. 2015.

"Sonus Advances Virtualization Offerings to Make Communications Networks More Flexible, Cost-effective," Sonus®, investors.sonusnet.com, http://investors.sonusnet.com/releasedetail.cfm?ReleaseID=874311 Oct. 2, 2014.

"Cirpack's IMS Full-SIP Strategy," Business Wire, Tech Zone 360°, techzone360.com, http://www.techzone360.com/news/2015/02/26/8151298.htm Feb. 26, 2015.

Ito, Manabu, et al., "Mechanism of Reducing Signaling Processing Load in EPC/IMS Using Service-Specific Network Virtualization," New Technologies, Mobility and Security (NTMS), http://ieeexplore.ieee.org/xpl/login.jsp?tp=&arnumber=68140322014 6th International Conference. IEEE, Mar. 30, 2014.

Xavier, Habinshuti Francois, Soonuk Seol, "A Comparative Study on Control Models of Software-Defined Networking (SDN)," Contemporary Engineering Sciences, vol. 7, 2014, No. 32, 1747-1753, School of Electrical, Electronics and Communication Engineering, (KOREATECH). http://m-hikari.com/ces/ces2014/ces29-32-2014/19xavierCES29-32-2014.pdf (2014).

Glitho, Roch, "Cloudifying the 3GPP IP Multimedia Subsystem: Why and How?," New Technologies, Mobility and Security (NTMS), 2014 6th International Conference. http://ieeexplore.ieee.org/xpl/login.jsp?tp=&arnumber=6814010 IEEE, 2014.

Tang, Chung-Shih, et al, "Collaboration of IMS and SDN to enable new ICT service creation," Network Operations and Management Symposium (APNOMS), 2014 16th Asia-Pacific. http://i-scover.ieice.org/proceedings/APNOMS/2014/pdf/127560.pdf IEEE, 2014.

Carella, Giuseppe, et al., "Cloudified IP Multimedia Subsystem (IMS) for Network Function Virtualization (NFV)-based architectures," Computers and Communication (ISCC), 2014 IEEE Symposium. http://cms.comsoc.org/SiteGen/Uploads/Public/Docs_Chapter_Portugal/Events/Workshop_MCN_20140619_GiuseppeCarella_TUB_Cloudified_IMS_for_NFV-based_Architectures.pdf IEEE, 2014.

* cited by examiner

| Request URI | Header 2 | Header n | Header Edit instruction | Forwarding Instruction |
|---|---|---|---|---|
| Header Match | Header Match | Header Match | Header Change | Disposition |
| Header Match | Header Match | Header Match | Header Change | Disposition |

IMPLEMENTING APPLICATION LEVEL MULTIMEDIA SERVICES AS A SWITCHING FUNCTION

TECHNICAL FIELD

Embodiments of the present disclosure relate to control of communications networks by virtualized network functions. More particularly, certain embodiments of the present disclosure are directed to the use of a set of simple, generalized virtual functions to perform switching functions and switching rules management functions.

BACKGROUND

Internet protocol (IP) multimedia subsystem (IMS) is an architectural framework for delivering application level IP multimedia services such as voice and video over a packet-switched network. An IMS core network layer typically comprises a number of Session Initiation Protocol (SIP) servers and proxies arranged to perform various sub-functions in a call session control function (CSCF) to process SIP signaling packets in the IMS. Those functions include a proxy CSCF (P-CSCF), a serving CSCF (S-CSCF) and an interrogating CSCF (I-CSCF).

SIP servers perform application level switching in layers 4-7 of the seven-layer OSI model of computer networking. That SIP layer 4-7 switching is distinct from SDN layer 2-3 switching that is performed to determine a route through the network between an origination network address and a termination network address. In SDN layer 2-3 switching, a controller collects paths from multiple SDN switches to get a network view, and send instructions to the switches (i.e., match-action table rules) that define routes between the origination and the termination. The routing can be done, for example, based on MAC addresses or IP addresses.

SIP servers performing layer 4-7 switching, in contrast, perform different functions. Specifically, given a message from a URI representing an identity as an origination, given the URI representing an identity for a termination and given a service definition, a SIP server performing layer 4-7 switching determines the actual network address(es) to which to deliver the message, and which functions need to be incorporated in the path. That is done by processing, at each switch, service rules defining edits to the incoming message and selection of the next destination. Multiple legs are used to incorporate functions or gateways rather than to create a routing path. Each leg's routing, once the destination address is determined, may be done using SDN.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EXEMPLARY EMBODIMENTS

Figure 1A:
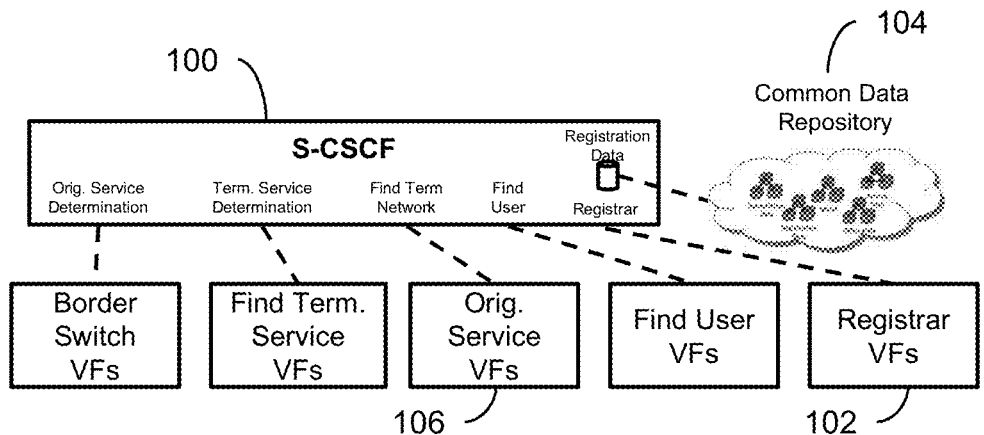
FIG. 1A is a block diagram showing a serving call session control function and its relationship to virtual functions in an Internet protocol multimedia subsystem.

IMS is a formal framework with a strong physical bias for what each element should do. For example, a standard SIP message within a single domain passes through multiple elements. A standard INVITE enters through a P-CSCF, and is routed to the S-CSCF that registered the originating party. The S-CSCF usually routes the INVITE to a telephony application server (TAS) which processes the message based on its headers. The TAS then routes the INVITE back to the S-CSCF which may route the INVITE through other SIP applications servers (SIP AS). After receiving the message from the last SIP AS, the S-CSCF determines that the INVITE is staying within the domain and routes it to an I-CSCF. The I-CSCF determines (using a Diameter query to a home subscriber server (HSS)) which S-CSCF has registered the called party and routes the INVITE there. The termination S-CSCF usually routes the INVITE to a TAS that processes the message based on its headers. The TAS then routes the INVITE back to the S-CSCF, which may route the INVITE through other SIP applications servers. After receiving the message from the last SIP AS, the S-CSCF determines which of the registered user agents (UAs) should be routed the INVITE and in what order. It routes to these user agents by sending the INVITE to a P-CSCF which routes the INVITE out of the IMS.

Traditional network architectural frameworks such as IMS are being replaced with more cloud friendly and scalable network frameworks including AT&T's Domain 2.0

("D2"). The D2 initiative seeks to transform available network services into services provided in a manner similar to cloud computing services, with the services instantiated, where possible, on common infrastructure.

Presently disclosed is a replacement of IMS and universal service platform (USP) elements, such as CSCFs and SIP Applications Servers, with reusable, modular, scalable, location agnostic virtual functions designed for D2. Replacing those elements with such virtual functions reduces complexity, manages state appropriately for scaling, reduces latency and lowers machine costs.

In certain embodiments of the present disclosure, a network for delivering multimedia services includes a plurality of hardware components. Computer readable memory contains instructions that, when executed by a respective one of the hardware components, cause the hardware component to instantiate a plurality of simple switch applications. Each simple switch application comprises: a plurality of rules defining message edits and determination of identification information for a destination device for a message; an interface for receiving a message; a function for editing the message and determining identification information for a destination device of the message according to the rules; and an interface for transmitting the message to the destination device according to the identification information.

Additionally, computer readable memory contains instructions that, when executed by a respective one of the hardware components, cause the hardware component to instantiate a plurality of rules managers for managing the rules.

A particular simple switch application of the plurality of simple switch applications and a particular set of rules managers of the plurality or rules managers operate to perform a network function for application level message processing, whereby the network function is performed by the particular simple switch application by performing application level message processing according to the rules managed by the particular set of rules managers.

Other embodiments of the disclosure include a method performed by a simple switch application for delivering multimedia services in a network. The method includes receiving, from a rules manager application, rules management messages for managing rules associated with the simple switch application; and updating the rules based on the rules management messages; receiving a payload message.

The method additionally includes performing a network function for application level processing of the payload message, the network function including determining an endpoint location for the payload message according to the rules, the endpoint location being defined by identification information for a destination device; and editing the payload message to cause transmittal of the payload message to the destination device.

In additional embodiments, a computer-readable storage device having stored thereon computer readable instructions is provided for delivering multimedia services in a network. Execution of the computer readable instructions by a processor causes the processor to perform operations comprising: receiving a payload message; and accessing rules managed via rules management messages from a rules manager application.

The operations also include performing a network function for application level processing of the payload message, the network function including: determining an endpoint location for the payload message according to the rules, the endpoint location being defined by identification information for a destination device, the endpoint location being determined based on a network state determined by the rules manager application and based on lookup results received by the rules manager application; and editing the payload message to cause transmittal of the payload message to the destination device.

The respective features of the disclosure may be applied jointly or severally in any combination or sub combination by those skilled in the art.

The presently described architecture provides an alternate set of building blocks that can be used to build USP, the International Routing Switch, Enhanced Push to Talk, WebRTC, IP Toll Free, IP Flex or any other similar application level services that basically route requests.

Specifically, the presently disclosed framework allows the implementation of IMS-like functions as a common switching function, with separately instantiated virtual functions for rule management. The framework recognizes that each of the IMS elements essentially accepts a SIP Message, does some matching on headers, optionally edits the headers and then either drops the message or sends it to one or more locations.

Many of the principles upon which IMS is based differ from those upon which D2 is implemented. For that reason, the presently disclosed framework refactors the functions previously performed by IMS elements such as the P-CSCF, S-CSCF and I-CSCF. For example, D2 requires scalability at the function level, while IMS emphasizes scalability at the server and higher levels. The IMS S-CSCF server combines multiple functions that may scale differently from each other and may scale differently from data repositories also incorporated in the S-CSCF. Increasing S-CSCF capacity therefore often results in inefficiencies. In an exemplary S-CSCF 100 shown in FIG. 1, for example, a registrar VF 102 may utilize registration data in a common data repository 104, while an origin service VF 106 may utilize different data. Scaling the S-CSCF 100 to increase capacity for one VF may therefore require unnecessarily scaling others. Separating those VFs permits separately scaling functions as needed.

Figure 1B:
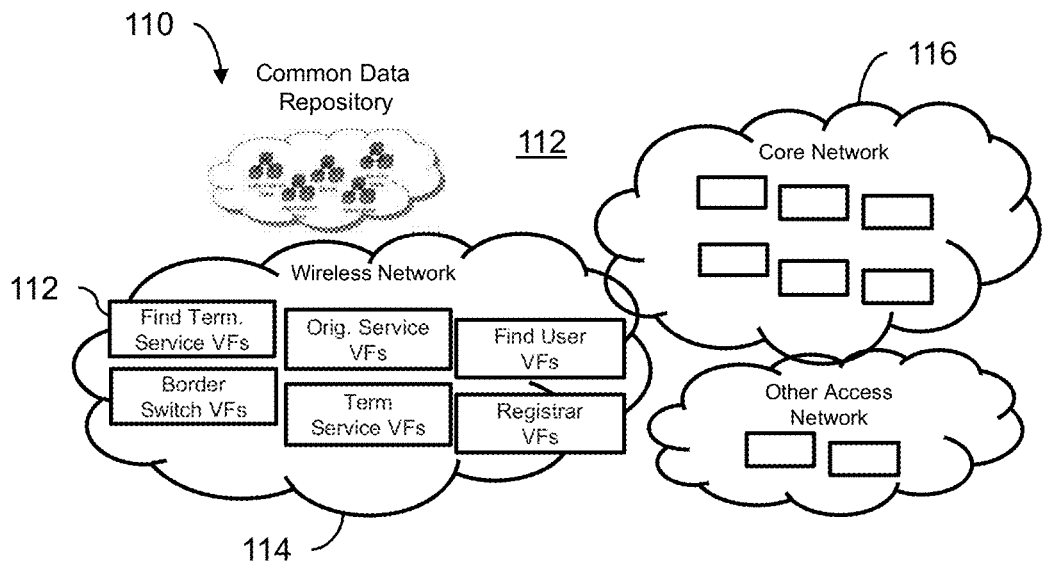
FIG. 1B is a block diagram illustrating an architecture of an Internet protocol multimedia subsystem.
Figure 1C:
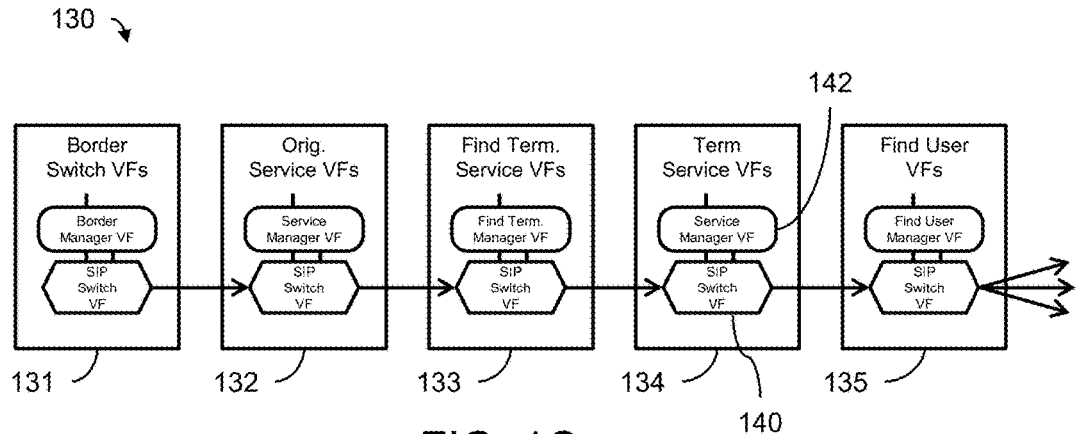
FIG. 1C is a diagrammatic representation of a series of virtual network functions according to embodiments of the disclosure.

As illustrated by the IMS architecture 110 shown in FIG. 1B, IMS services 112 such as those supporting a wireless network 114 are provided by the core network 116 around the S-CSCF. The presently disclosed architecture refactors the functions in keeping with the D2 principle that they be execution agnostic, permitting the deployment of virtual functions anywhere they are needed.

IMS elements including the P-CSCF, S-CSCF and I-CSCF provide both rules management and a switching function. In accordance with the D2 principal that the switching function should be separated from switch management, the presently disclosed architecture includes virtual functions that each include separate switching functions and manager functions, as illustrated by the series of virtual network functions 130 shown in FIG. 1C. The series 130 includes five different virtual network functions including a border switching function 131, an originating service function 132, a find termination function 133, a termination service function 134 and a find user function 135. Each of the five virtual functions utilizes the same standardized switching virtual function 140, but utilizes a more specialized rules manager virtual function selected from a group of standardized manager virtual functions as discussed in more detail below. For example, the terminating service function 134 utilizes a service manager virtual function 142 for managing rules of the SIP switch virtual function.

Figure 1D:
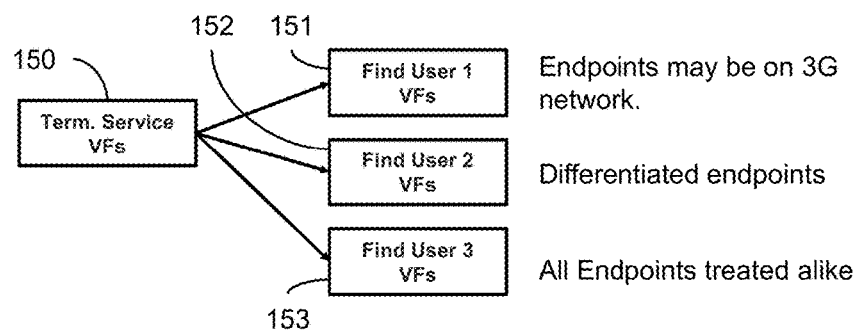
FIG. 1D is a block diagram showing the provisioning of services according to embodiments of the disclosure.

IMS elements such as the S-CSCF provide "one size fits all" services, regardless of the requirements of the user. In accordance with D2 principals, the presently described architecture separates functions to allow provisioning of services based on the user. For example, as shown in FIG. 1D, a termination service virtual function 150 may be instantiated for user 1 as a find user VF 151 wherein endpoints may be on a 3G network. Similarly, the termination service virtual function 150 may be instantiated for user 2 as a find user VF 152 with differentiated endpoints, and for user 3 as a find user VF 153 with all endpoints treated alike.

In accordance with the present disclosure, a routing engine is provided to perform various application level functions relating to the determination of an endpoint location to which to deliver a message in a network. The endpoint location is determined based on various characteristics of the message, according to rules in a match-action table in a simple switch that is part of the routing engine. The endpoint location may, for example, be identified by a uniform resource identifier (URI) which, as used herein, means a string of characters used to identify a resource or a location in a network. URIs used as endpoints by the presently described system include uniform resource locators (URLs) as well as telephone numbers, email addresses, subscriber identifications and any other locator used to identify a destination endpoint.

Figure 2:
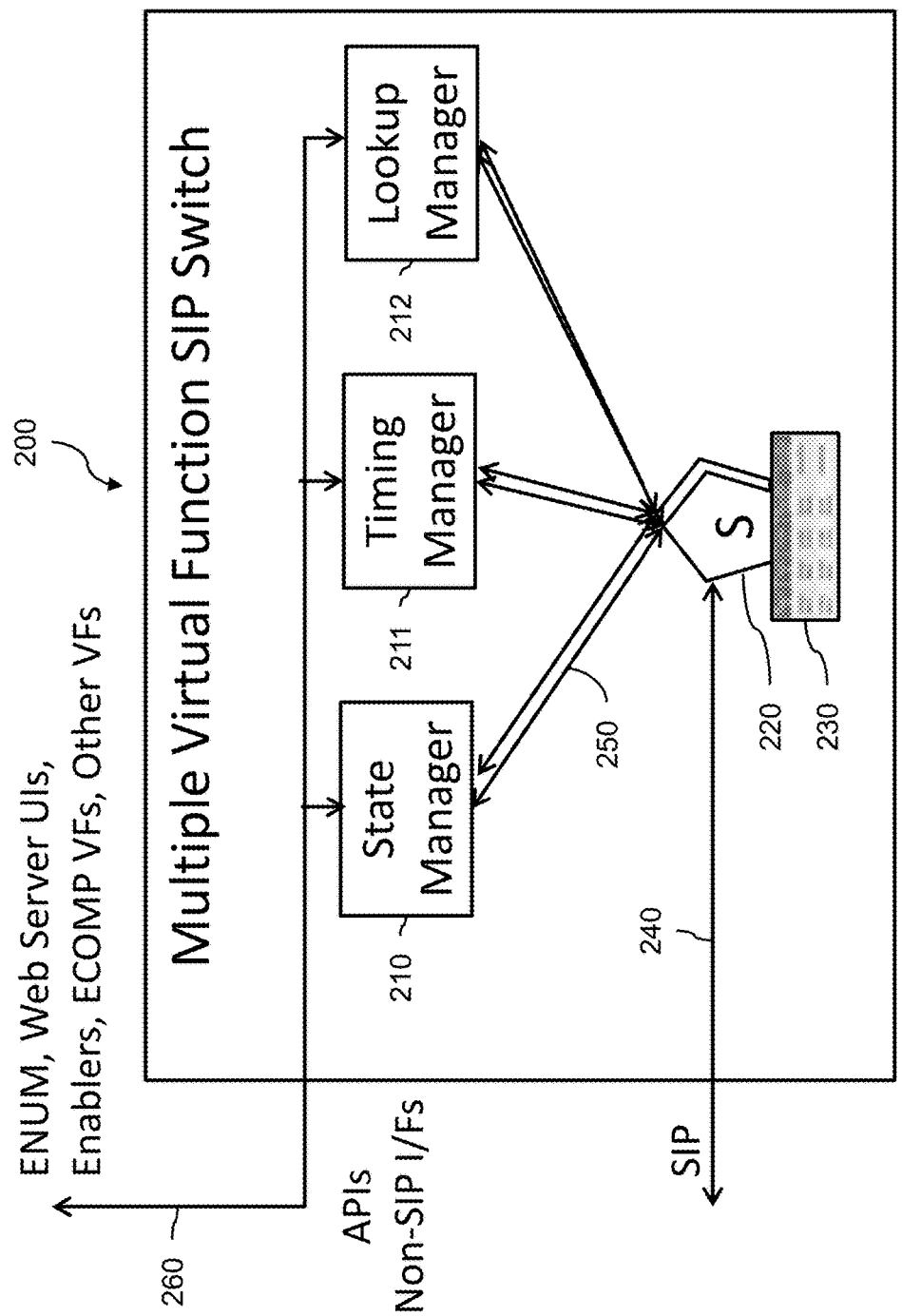
FIG. 2 is a schematic diagram showing a multiple virtual function SIP switch according to embodiments of the disclosure.

One such routing engine in accordance with embodiments of the present disclosure is a multiple virtual function SIP switch 200, shown in FIG. 2. The switch application 200 is specifically for handling messages in a SIP network. One skilled in the art will recognize that similar routing engines or applications may be constructed in other types of networks, and that the SIP routing engine of FIG. 2 is merely exemplary. The multiple virtual function SIP switch 200 comprises several elements, including manager virtual functions 210, 211, 212, a simple SIP switch virtual function 220, match action tables 230, interfaces 240 for incoming/outgoing payload messages, interfaces 250 for messages and control between the managers and the switch, and external interfaces 260 for the mangers.

Three types of manager VFs are contemplated for performing the needed functions. The three types reflect more diverse functionality at the application level than for SDN controllers. The managers include a state manager 210, a timing manager 211 and a lookup manager 212, as will be explained in more detail below.

The Simple SIP Switch VF 220 performs rules processing doing separate transactions. The rules are stored in a match-action table 230, which is part of the simple switch 220. The rules are stored and treated as data to be processed by the switch 220. Incoming messages are received and outgoing messages are transmitted via the interfaces 240, which connect to the message network; in this case, a SIP network.

The managers 210, 211, 212 add, update and delete rules in the match-action table 230 via interfaces 250 with the switch 220. The managers are also connected to external networks via the external interfaces 260, which are used for user and network management, lookups, subscriptions and event notifications. The managers may, for example, access external networks for services such as ENUM, Web server UIs, enablers, ECOMP VFs and other VFs.

Figure 3:
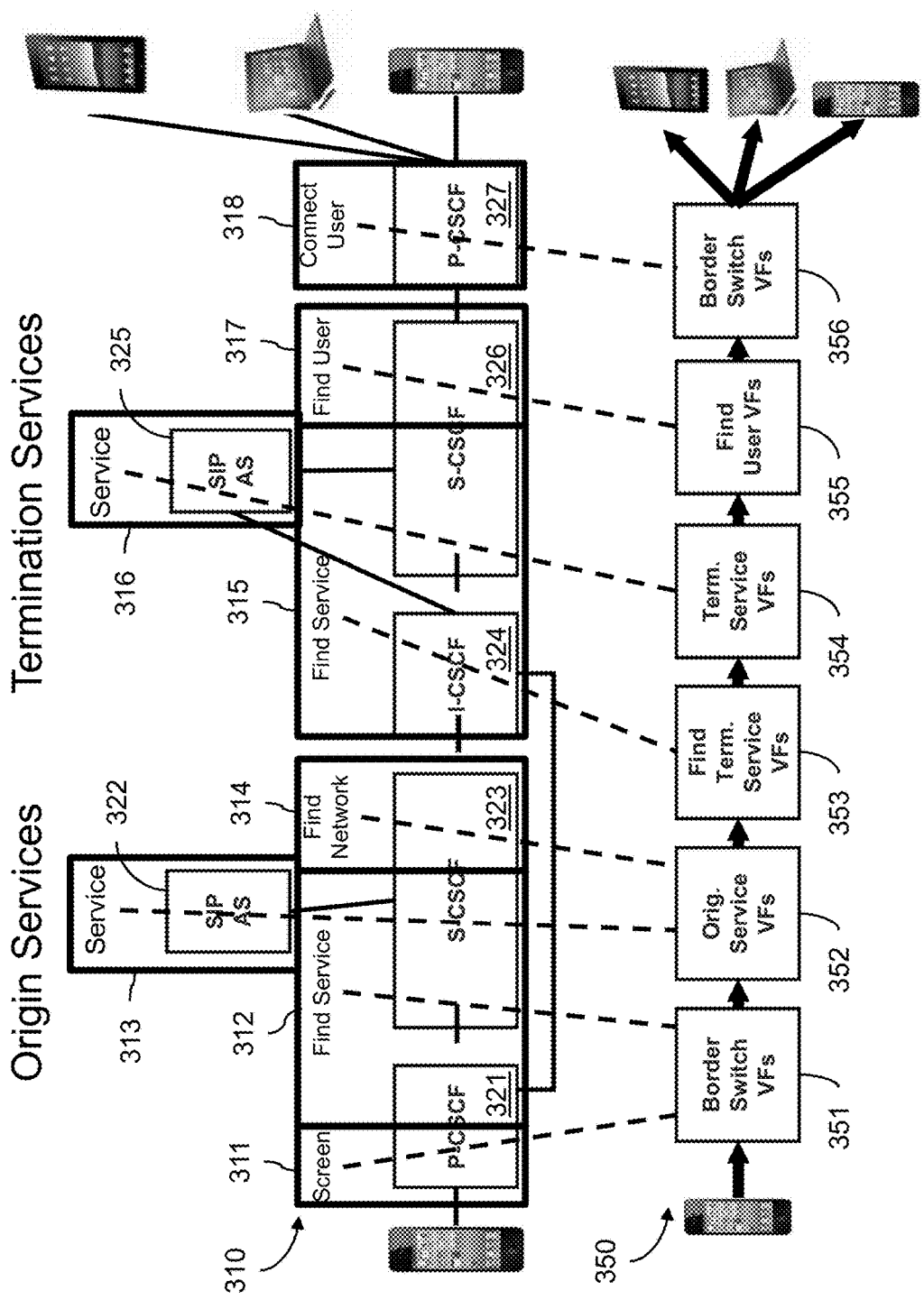
FIG. 3 is a flow diagram showing the refactoring of IMS functions in a message flow according to embodiments of the disclosure.

A typical IMS call processing sequence 310 is shown in FIG. 3 together with a corresponding flow 350 of virtual functions according to the presently described D2 architecture. The dashed lines in the figure illustrate how the IMS functions are disaggregated and distributed in the presently described architecture.

Specifically, border switch VFs 351 of the presently described system perform a screen function 311 that was performed in the IMS sequence 310 by a P-CSCF 321. The border switch VFs 351 additionally perform a find service function 312 that was performed by the P-CSCF 321 and a S-CSCF 323.

Origin service VFs 352 provide an origin service 313 previously provided by a SIP application server 322. The origin service VFs 352 additionally perform a find network function 314 that was performed by the S-CSCF 323 in the IMS sequence 310.

Find termination service VFs 353 perform a find service function 315 previously performed by a I-SCSF 324 and a S-SCSF 326. Termination service VFs 354 provide a termination service 316 previously provided by a SIP application server 325.

Find user VFs 355 perform a find user function 317 previously performed by the S-SCSF 326. Border switch VFs 356 perform a connect user function 318 previously performed by a P-SCSF 327.

Each of the above disaggregated functions 351-356 is essentially a logical switch comprising a simple switch function for processing messages according to rules, together with one or more rules management functions interfacing with the simple switch function to change, add to, remove from and update the rules. The presently disclosed architecture utilizes various combinations of standardized rules management functions interfacing with a simple switch function to perform each of the disaggregated functions 351-356 described above.

As noted, in embodiments of the present disclosure, the standardized rules management functions include a state manager, a timing manager and a lookup manager. The rules managers may run on virtual or physical machines; i.e., the manager code can run in virtualized or containerized environments.

The state manager maintains all rules in the simple switches that are dependent on state. It tracks all variables that can influence state (e.g. registered, time of day, location) for the rules it maintains. When the state changes, the state manager determines whether a new rule must be put into effect and changes the rule in the simple switch.

The timing manager handles all protocol timing, re-sends and timing related messages (e.g. SIP's 100 trying). The timing manager is also used to handle any sequential routing where timeouts or other reasons for non-acceptance can be used to try the next prioritized target.

The lookup manager handles any lookups that must be performed before the simple switch can route the message. A typical lookup performed by a switch handling SIP messages is ENUM. The lookup manager can also find the terminating rules if they are not locally available at the simple switch.

Figure 4:
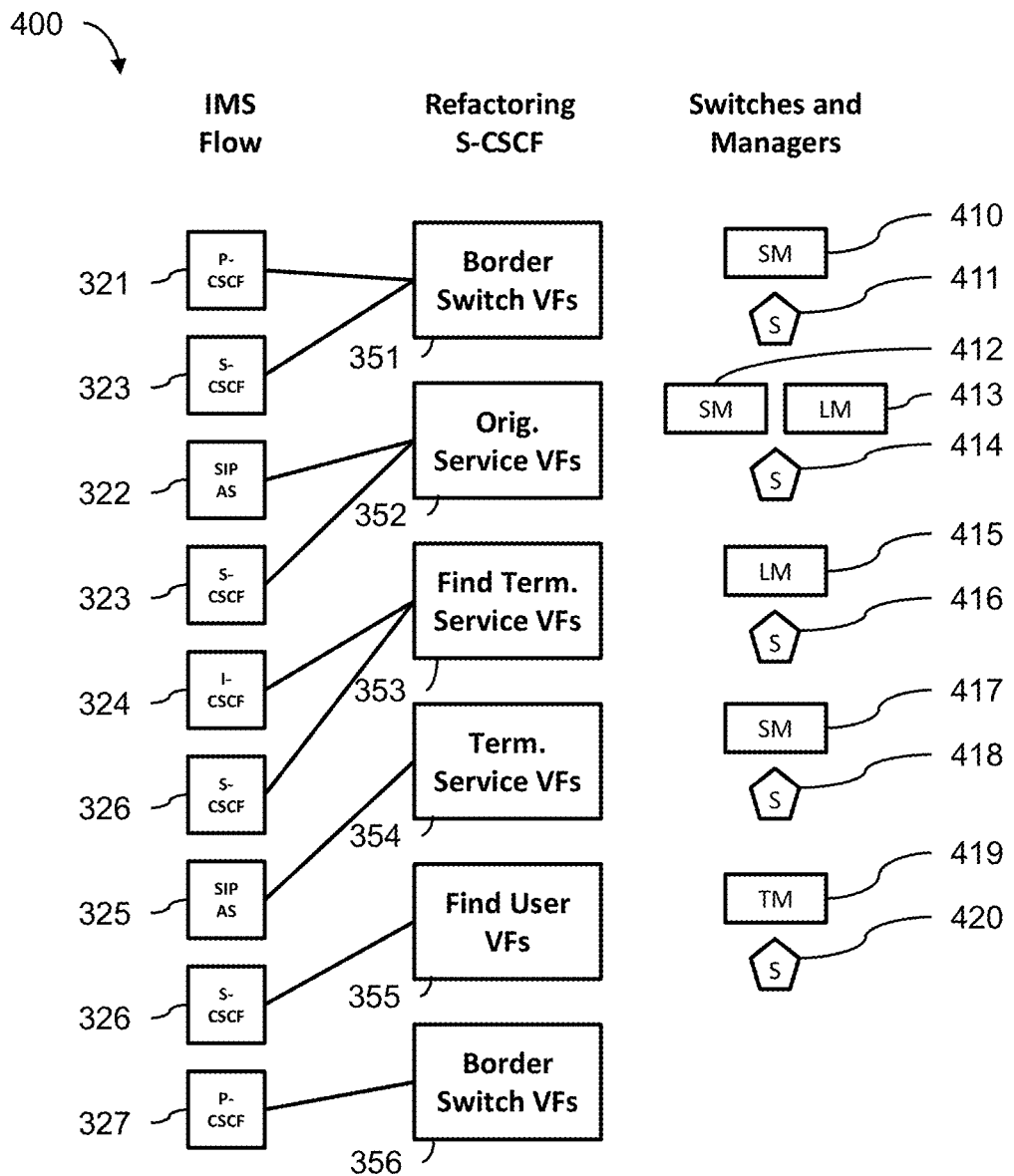
FIG. 4 is a schematic diagram showing the disaggregation of refactored IMS functions into simple switches and rules managers according to embodiments of the disclosure.

The table 400 shown in FIG. 4 illustrates the use of the three described rules managers, together with simple switches, to perform each of the refactored functions 351-356 shown in FIG. 3. In the table 400, the IMS elements 321-327 that previously performed those functions are shown for reference in the first column, and the refactored functions 351-356 are shown in the second column. In the third column, the switches and managers comprising the logical switches that perform the refactored functions 351-356 are shown.

The border switch VFs 351 are performed by a state manager 410 and a simple switch 411. The state manager 410 changes rules of the switch 411 based on registration state. The state manager learns location or originating services at registration time. The originating service VFs 352 are performed by a state manager 412 and a lookup manager 413 interfacing with a simple switch 414. The state manager 412 changes rules based on service state (e.g. location, customer user options). The lookup manager 413 handles Request URI routing.

The find termination service VFs 353 are performed by a lookup manager 415 and a simple switch 416. If terminating rules are not local then the lookup manager 415 finds the closest location that already has terminating rules. The termination service VFs 354 are performed by a state manager 417 and a simple switch 418. The state manager 417 changes rules of the simple switch 418 based on service state (e.g. location, customer options).

The find user VFs 355 are performed by a timing manager 419 and a simple switch 420. The timing manager orders any differentiated endpoints and manages timeouts and multiple responses. The timing manager also manages SIP timers and re-sends. In that role it is needed at all switches. Connections may terminate at a data center and be accessed by the find user VF.

Figure 5:
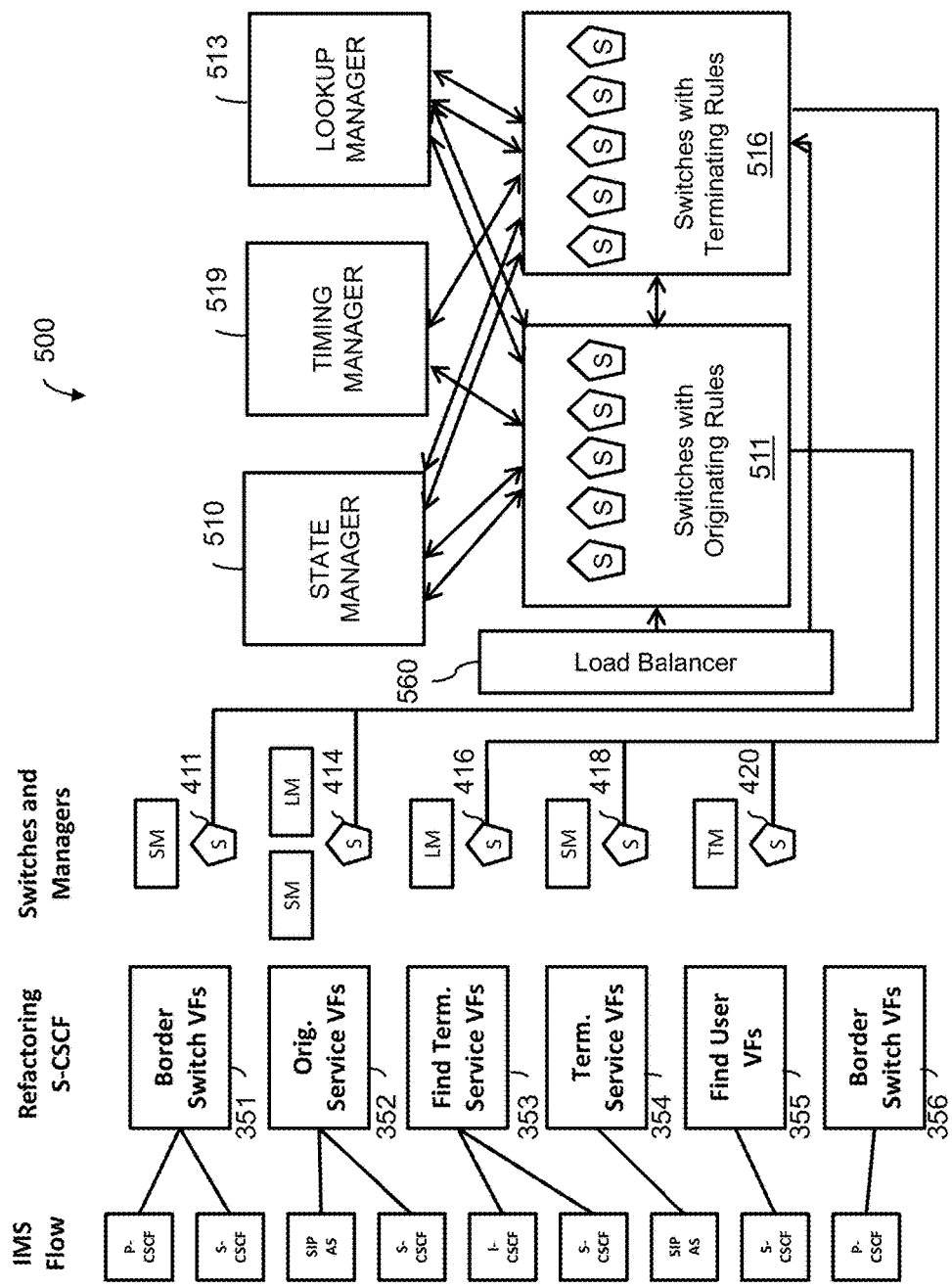
FIG. 5 is a schematic diagram showing refactored IMS functions performed by a logical switch according to embodiments of the disclosure.

In sum, as shown in the block diagram 500 of FIG. 5, each of the various refactored virtual functions 351-356 may be performed by a logical switch constructed in accordance with the present disclosure from simple switch VFs 511, 516 that process rules and manager VFs 510, 513, 519 handling what the simple switches cannot. The simple switches 511 include switches operating with originating rules, while the simple switches 516 operate using terminating rules. A load balancer function 560 is implemented to distribute workloads across the switches.

Figures 6A, 6B:
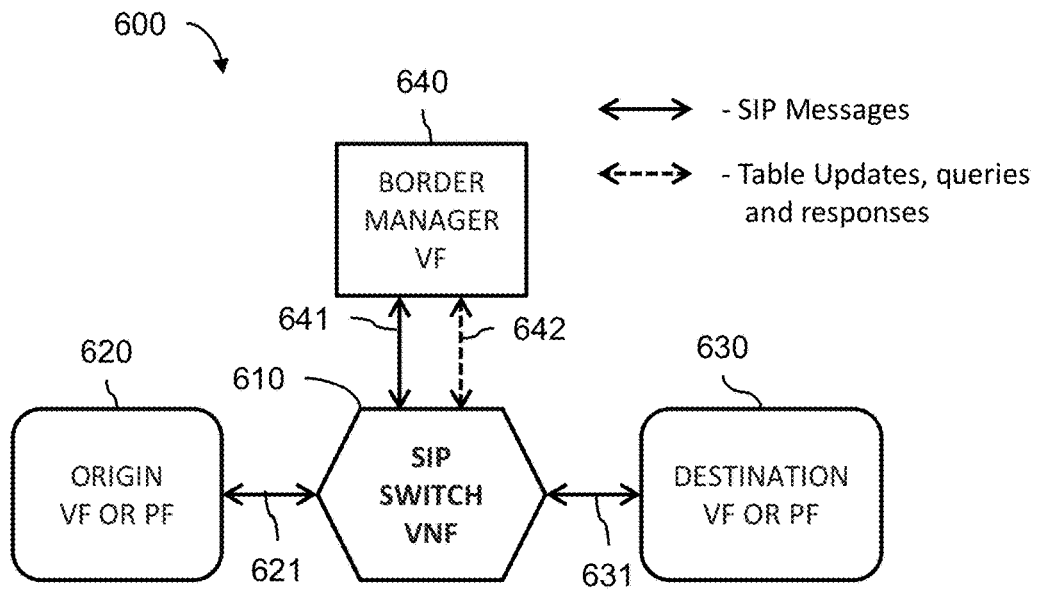
FIG. 6A is a schematic diagram showing a logical switch with origin and destination functions according to embodiments of the disclosure.
FIG. 6B is an example match-action table according to embodiments of the disclosure.

A block diagram 600 of FIG. 6A illustrates a simple SIP switch 610 in accordance with the present disclosure, showing its interfaces. An example rules table 660 is shown in FIG. 6B. The simple switch 610 processes messages based on the current rules in the table 660. Its transactions are complete and it does not expect responses. The simple switch does not send queries or subscribe to events.

The switch 610 performs several functions. The switch accepts a message from a source 620 via an incoming message interface 621. In the case of USP replacement, the message is a SIP message. The switch also looks at message headers to determine whether to change headers and determines a destination VF or PF 630 to which to route the edited message via an outgoing message interface 631.

The interfaces 621, 631 are specific interfaces for input and output of SIP messages between the switch 610 and originating or destination VFs or PFs. The interface 641 is a specific message interface for exchanging SIP (or other) messages with the switch's rules managers 640.

An additional interface 642 is with the switch's managers 640 is provided so that the managers may send table updates or queries and get responses.

The term "switch" as used herein refers to a function or logic (implemented by hardware, software or a combination of both) that controls switching decisions, such as the modification of an incoming message header and the determination of where it should be sent. The term encompasses functions or logic performed by dedicated hardware such as that available or to be available from merchant silicon switch suppliers, which may support custom switch hardware creation based on D4 programs. The term additionally encompasses functions or logic performed by virtual machines.

Figure 7:
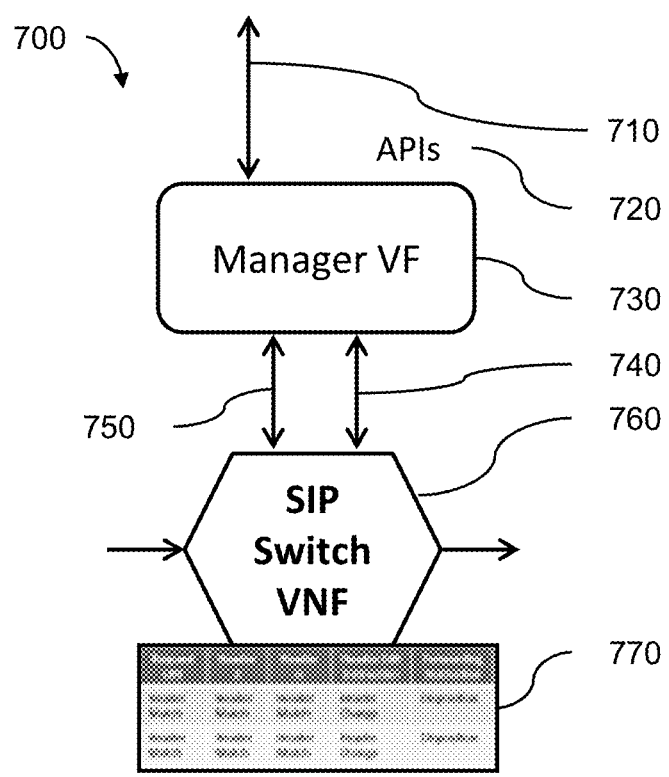
FIG. 7 is a schematic diagram showing a logical switch according to embodiments of the disclosure.

In the schematic diagram 700 shown in FIG. 7, a SIP switch VNF 760 according to embodiments of the present disclosure is depicted to further explain the modeling of virtual functions as SIP switches in accordance with embodiments of the disclosure. An attribute of the switch function of the present disclosure is that switching is separated from service logic, knowledge of state, data interfaces and exposed APIs.

A network interface 710 allows data accesses and subscriptions to events/enablers by the manager VF 730. APIs 720 expose capabilities to other functions. The manager VF 730 maintains service logic and tracks state when necessary. The manager VF 730 may access data and subscribe to events, and may manage one or more switches' match-action tables 770.

The SIP switch VNF 760 is separated from the manager VF by the standardized interfaces 740, 750 that allow the passing of messages and control of the match action table 770. The interfaces may be restricted interfaces.

The SIP switch VNF 760 is used in a number of different disaggregated virtual functions for real time message processing. The switch performs operations according to the match-action table 770. The switch requires no high-level service logic, and utilizes limited interfaces. The match-action table 770 indicates header changes and destination selection decisions to be performed by the switch function 760 for incoming messages.

Functions that do not terminate sessions are the best candidates to be implemented as a SIP switch. SIP application servers that act as user agents (UAs) are not switches. Back-to-back UAs may be implemented as switches, depending on the service.

Figure 8:
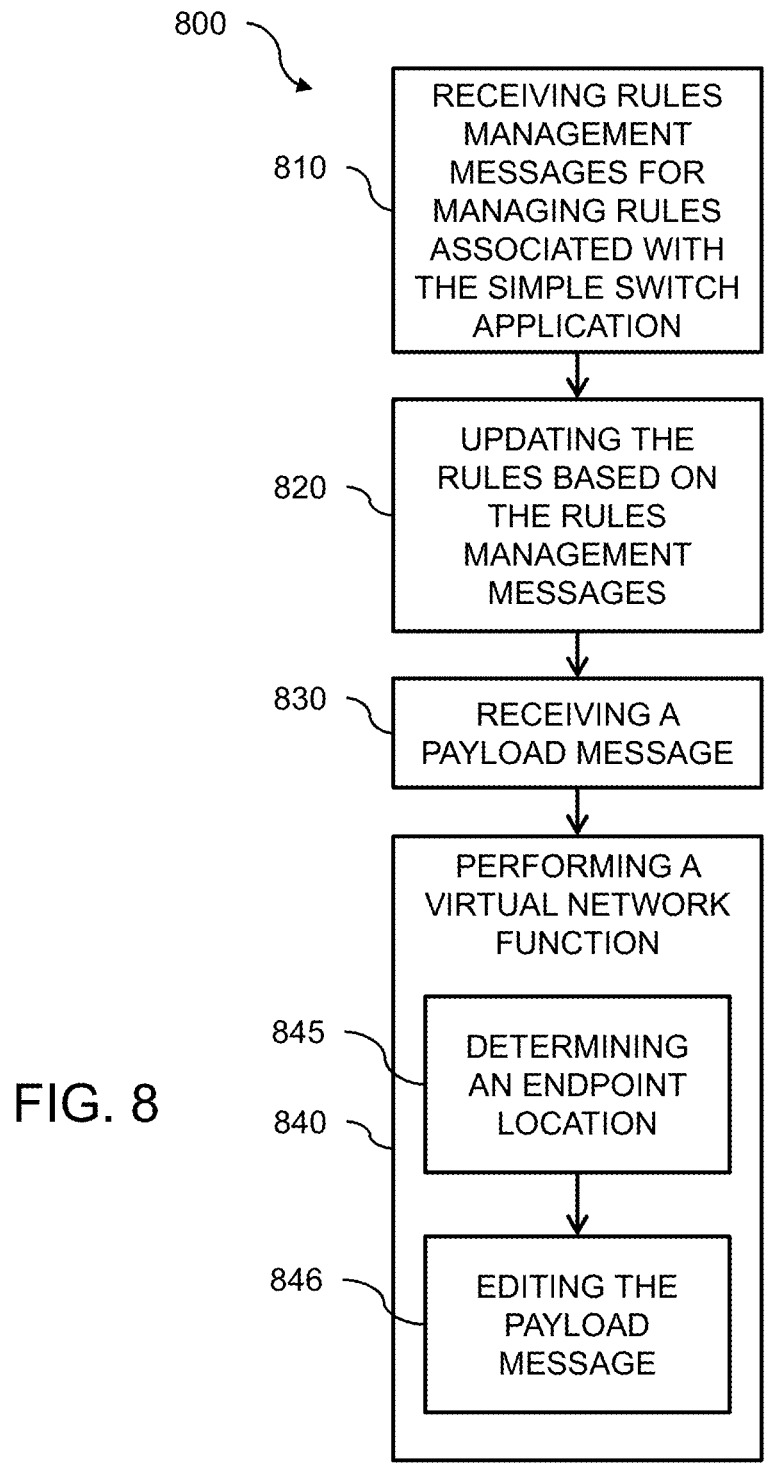
FIG. 8 is a flow chart showing a method according to embodiments of the disclosure.

A method 800 in accordance with the present disclosure is illustrated by the flow chart of FIG. 8. The method is performed by a simple switch application for delivering multimedia services in a packet switched network.

Rules management messages are received at block 810, from at least one rules manager application, for managing rules associated with the simple switch application. The rules are updated at block 820 by the simple switch application based on the rules management messages.

A payload message is then received (block 830) at the simple switch application. The simple switch application performs a virtual network function at block 840 for application level processing of the payload message. The virtual network function 840 includes determining an endpoint location at block 845. The endpoint location is determined according to the rules, and is defined by identification information for a destination device. The virtual network function 840 also includes editing the payload message at block 846 to cause transmittal of the payload message to the destination device.

Figure 9:
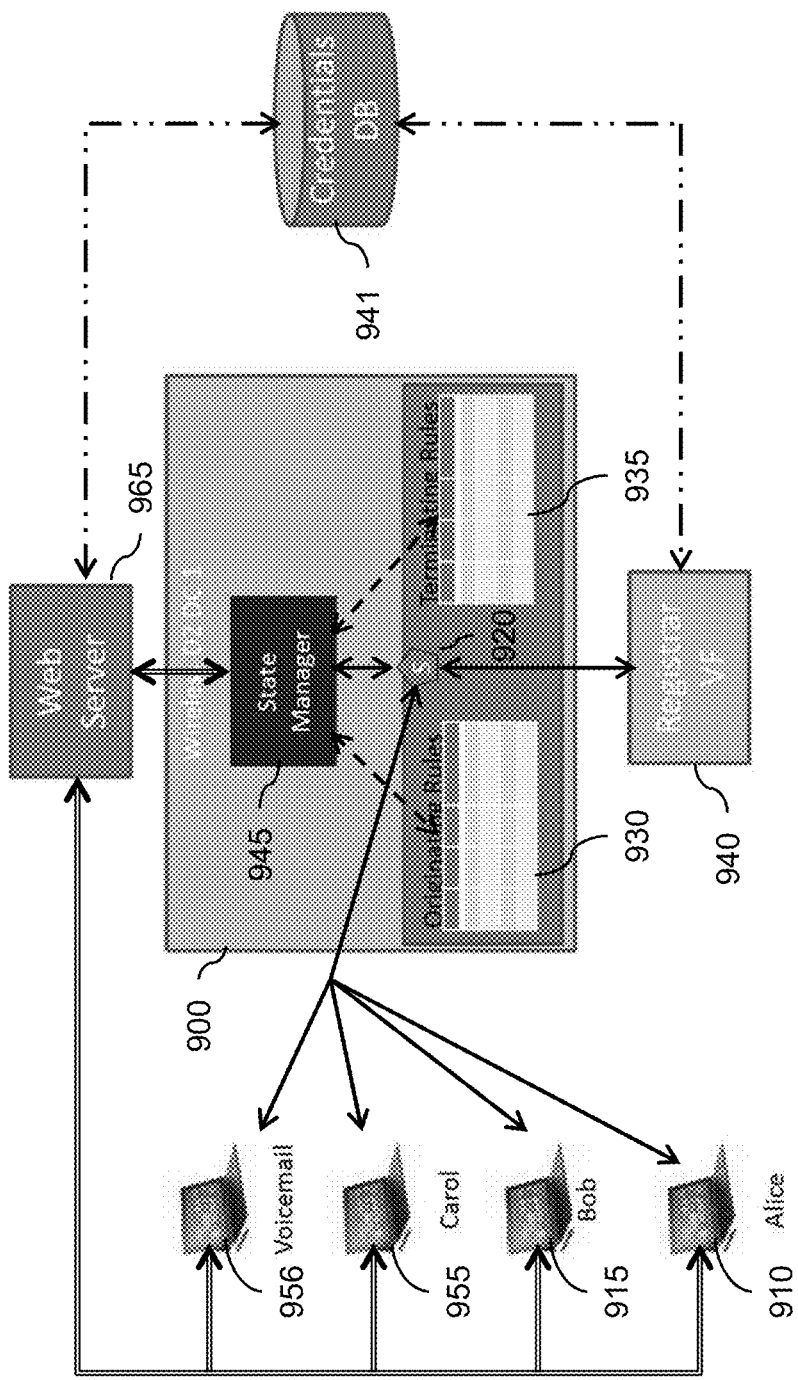
FIG. 9 is a schematic diagram showing a logical switch together with network components and connections according to embodiments of the disclosure.

Reference is now made to FIG. 9 which shows a routing engine system 900 according to the present disclosure, together with other components of a SIP network, to illustrate interconnections used by the system in implementing various virtual functions. While the exemplary network is a SIP network, other protocols may be used while remaining within the scope of the disclosure.

Multiple user agents (UAs) 910, 915, 955, 956 may establish HTTP sessions (shown as double lines) with a Web server 965 to implement various services as exemplified below. The Web server 965 is connected to a state manager 945 of the system 900 a via another HTTP connection, to implement the requested services.

The state manager 945 updates the originating rules 930 and the terminating rules 935 of a simple SIP switch 920 via updating interfaces shown as dashed lines.

The simple SIP switch 920 exchanges SIP messages (shown as solid lines) with the user agents 910, 915, 955, 956 in accordance with the rules tables 930, 935. The simple SIP switch 920 also exchanges SIP messages with the state manager 945 and with a registrar VF 940.

A credentials database 941 exchanges credentials information (shown as a dashed/dotted line) with the registrar VF 940 during a registration. The credentials database 941 additionally exchanges credentials information with the Web server to implement credentials updates, etc.

Figure 10:
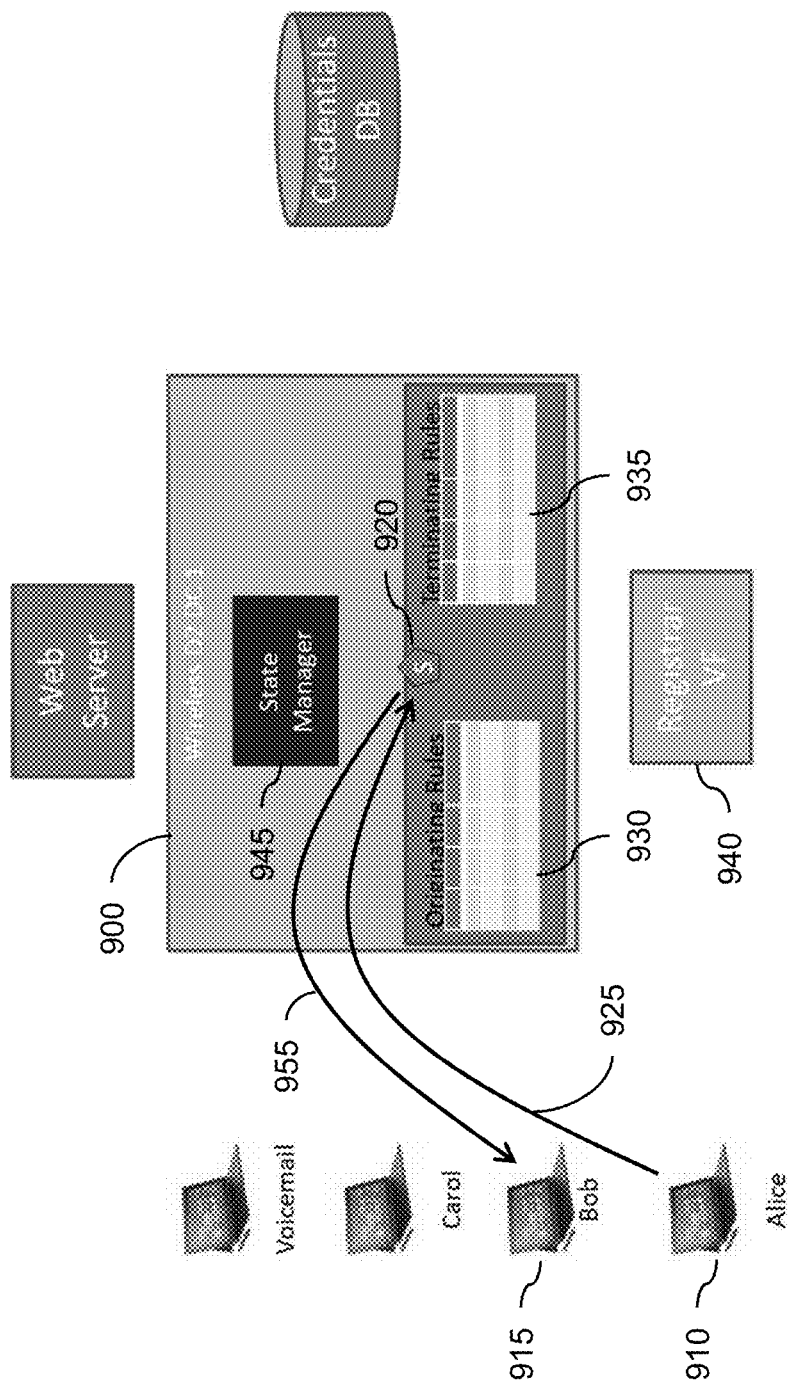
FIG. 10 is a schematic diagram showing a transaction among network components and connections according to embodiments of the disclosure.

An example transaction performed by the routing engine system 900, in which a UA 910 operated by Alice calls a UA 915 operated by Bob, is illustrated in FIG. 10. While the transaction is shown performed in an exemplary SIP environment, one skilled in the art will recognize that similar transactions may be performed according to the present disclosure in other protocol environments as well.

The Alice UA 910 initially composes an INVITE for the Bob UA 915. The INVITE is sent to SIP switch 920 in the routing engine 900, as illustrated by the arrow 925. The SIP switch 920 consults the originating rules 930, which indicate that the message should be allowed and that terminating rules 935 should be processed.

The terminating rules 935 indicate how to route to Bob (Bob's UA) according to the registrar 940. The state manager 945 will have subscribed to REGISTER event when multiple switches are deployed and will update the terminating rules 935. The switch 920 then routes INVITE to the Bob UA 915, as illustrated by the arrow 955.

Figure 11:
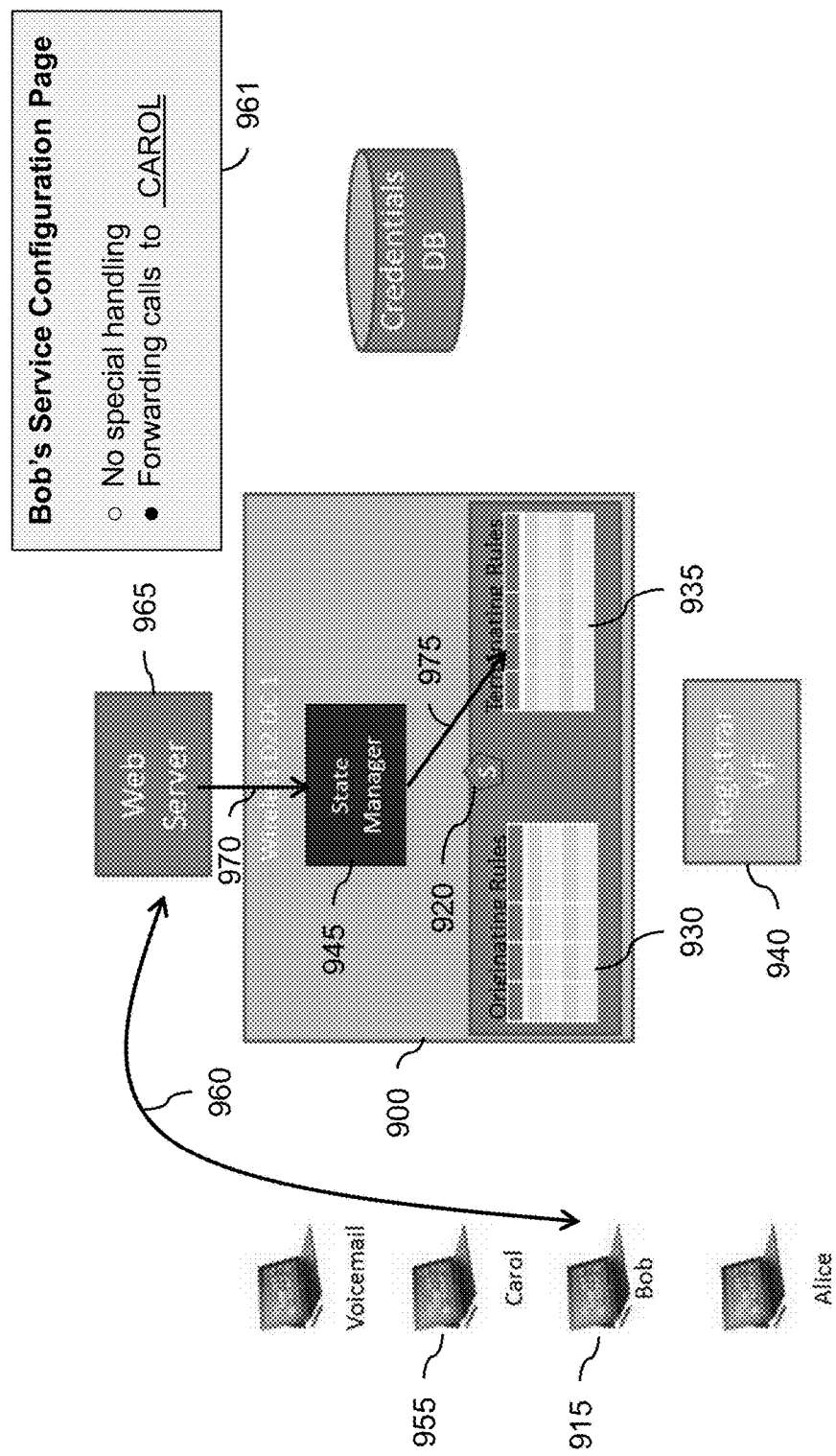
FIG. 11 is a schematic diagram showing another transaction among network components and connections according to embodiments of the disclosure.

Another example transaction performed by the routing engine system 900 according to the present disclosure, in which the UA 915 operated by Bob turns on call forwarding to a UA 955 operated by Carol, is illustrated in FIG. 11. Bob initially accesses his service configuration Web page 961 via the Web server 965, as illustrated by the arrow 960. Using the service configuration Web page 961, Bob selects call forwarding and has calls sent to the Carol UA 955.

The Web server 965 gets the changes and informs the state manager 945 of the customer choices, as illustrated by the arrow 970. The state manager 945 updates terminating rules 935 for Bob.

Figure 12:
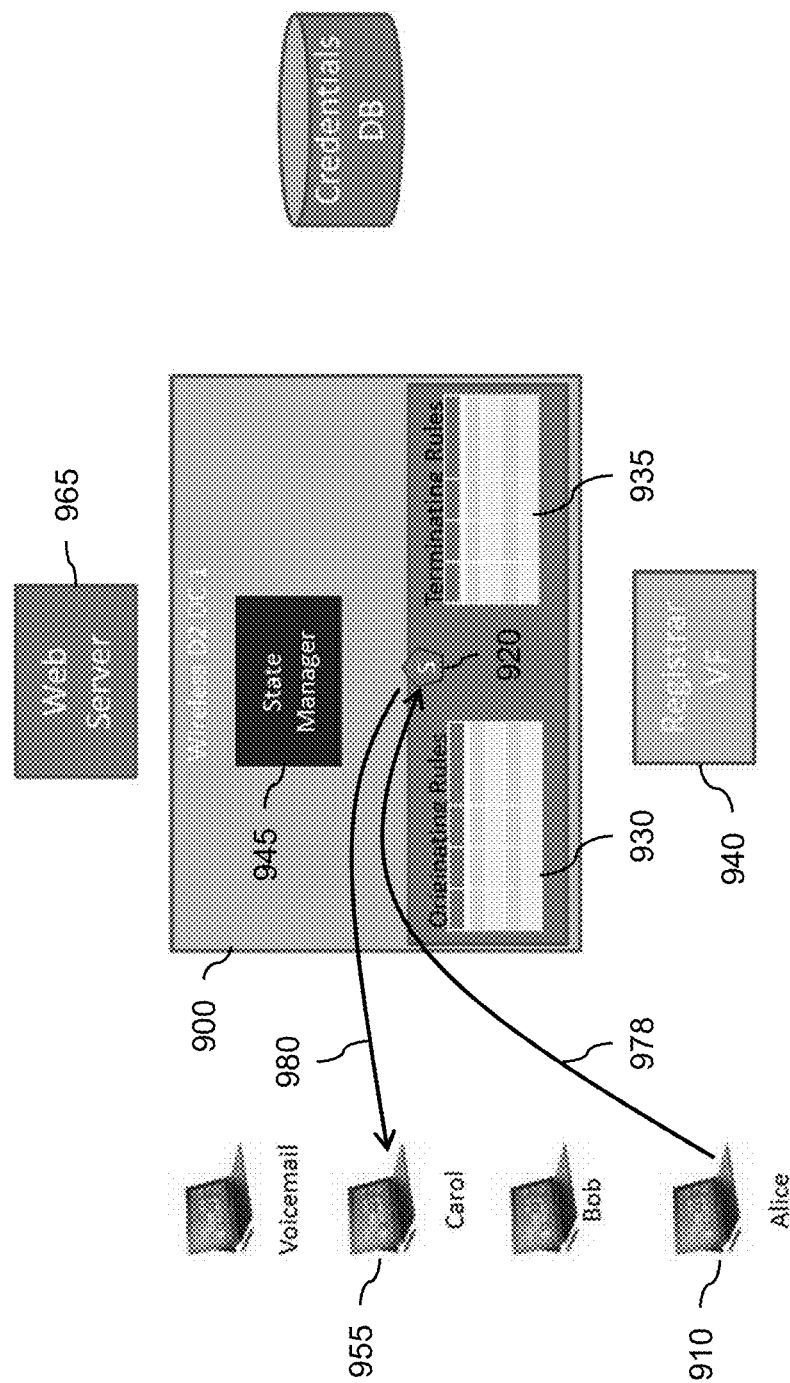
FIG. 12 is a schematic diagram showing another transaction among network components and connections according to embodiments of the disclosure.

In an additional example transaction performed by the routing engine system 900 according to the disclosure, the UA 910 operated by Alice calls Bob, who has his calls forwarded to the UA 955 operated by Carol. That transaction is illustrated in FIG. 12. The Alice UA 910 composes an INVITE message for Bob, and transmits the INVITE to the SIP switch 920, as illustrated by the arrow 978. The SIP switch 920 accesses the originating rules 930, which allow the message and indicate to process the terminating rules 935. The terminating rules for Bob indicate to route to the Carol UA 955 and run the terminating rules for Carol.

The terminating rules 935 for Carol indicate how to route to Carol. The switch 920 routes the INVITE message to the Carol UA 955.

The hardware and the various servers discussed above comprise one or more processors, together with input/output capability and computer readable storage devices having computer readable instructions stored thereon that, when executed by the processors, cause the processors to perform various operations. The processors may be dedicated processors, or may be mainframe computers, desktop or laptop computers or any other device or group of devices capable of processing data. The processors are configured using software according to the present disclosure.

Each of the hardware elements also includes memory that functions as a data memory that stores data used during execution of programs in the processors, and is also used as a program work area. The memory may also function as a program memory for storing a program executed in the processors. The program may reside on any tangible, non-volatile computer-readable storage device as computer readable instructions stored thereon for execution by the processor to perform the operations.

Generally, the processors are configured with program modules that include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, mini-computers, mainframe computers and the like, and may employ a distributed computing environment, where tasks are performed by remote processing devices that are linked through a communications network. In a distributed computing environment, modules may be located in both local and remote memory storage devices.

An exemplary processing module for implementing the methodology above may be stored in a separate memory that is read into a main memory of a processor or a plurality of processors from a computer readable storage device such as a ROM or other type of hard magnetic drive, optical storage, tape or flash memory. In the case of a program stored in a memory media, execution of sequences of instructions in the module causes the processor to perform the process operations described herein. The embodiments of the present disclosure are not limited to any specific combination of hardware and software.

The term "computer-readable medium" as employed herein refers to a tangible, non-transitory machine-encoded medium that provides or participates in providing instructions to one or more processors. For example, a computer-readable medium may be one or more optical or magnetic memory disks, flash drives and cards, a read-only memory or a random access memory such as a DRAM, which typically constitutes the main memory. The terms "tangible media" and "non-transitory media" each exclude transitory signals such as propagated signals, which are not tangible and are not non-transitory. Cached information is considered to be stored on a computer-readable medium. Common expedients of computer-readable media are well-known in the art and need not be described in detail here.

The forgoing detailed description is to be understood as being in every respect illustrative and exemplary, but not restrictive, and the scope of the disclosure herein is not to be determined from the description, but rather from the claims as interpreted according to the full breadth permitted by the patent laws. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. It is to be understood that various modifications will be implemented by those skilled in the art, without departing from the scope and spirit of the disclosure.

What is claimed is:

1. A network for delivering multimedia services, comprising:
 a plurality of hardware components;
 a computer readable memory containing instructions that, when executed by a respective one of the plurality of hardware components, causes the plurality of hardware components to:
  instantiate a plurality of match-action tables for storing rules, each match-action table comprising a first column defining a header edit instruction to be performed on a matching message, each match-action table further comprising a second column defining a forwarding instruction to be performed on the matching message;
  instantiate a plurality of standardized simple switch applications, each standardized simple switch application being the same as the other standardized simple switch applications of the plurality of standardized simple switch applications and each standardized simple switch application comprising:
   an interface for receiving the matching message;
   a function for editing the matching message in accordance with the header edit instruction defined in the first column of the match action table and determining an identification information for a destination device of the matching message in accordance with the forwarding instruction defined in the second column of the match-action table; and
   an interface for transmitting the matching message to the destination device according to the identification information; and
  instantiate a plurality of rules managers for managing the rules; wherein:
 a first standardized simple switch application of the plurality of standardized simple switch applications, a first match-action table of the plurality of match-action tables, and a first set of rules managers of the plurality of rules managers, operate to perform a first network function for application level message processing, whereby the first network function is performed by the first standardized simple switch application by performing the application level message processing according to the rules stored in the first match-action table and managed by the first set of rules managers; and
 a second standardized simple switch application of the plurality of standardized simple switch applications, a second match-action table of the plurality of match-action tables, and a second set of rules managers of the plurality of rules managers, operate to perform a second network function for the application level message processing, the second network function being different from the first network function, whereby the second network function is performed by the second standardized simple switch application by performing the application level message processing according to the rules stored in the second match-action table and managed by the second set of rules managers.

2. The network of claim 1, wherein the first set of rules managers comprises:
 a state manager for maintaining state-dependent rules followed by the first standardized simple switch application.

3. The network of claim 1, wherein the first set of rules managers comprises:
 a lookup manager for performing lookups for message routing by the first standardized simple switch application.

4. The network of claim 1, wherein the first set of rules managers comprises:
 a timing manager for handling dependencies between multiple transmitting attempts of the first standardized simple switch application.

5. The network of claim 4, wherein the timing manager includes a find user function comprising:
 determining and prioritizing potential endpoints for the matching message; and
 transmitting the matching message to the potential endpoints simultaneously or sequentially based on priorities of the potential endpoints.

6. The network of claim 1, wherein the first network function includes an originating service function comprising:
 operation of a first state manager of the first set of rules managers to change rules based on a first service state;
 operation of a lookup manager of the first set of rules managers to perform lookups to handle request uniform resource identifier routing; and
 operation of the first standardized simple switch application to conduct transactions according to rule changes by the first state manager and according to lookups by the lookup manager.

7. The network of claim 6, wherein the second network function includes a terminating service function comprising:
 operation of a second state manager of the second set of rules managers to change rules based on a second service state; and
 operation of the second standardized simple switch application to conduct transactions according to rule changes by the second state manager.

8. The network of claim 1, wherein the first standardized simple switch application is for processing session initiation protocol messages.

9. The network of claim 1, wherein the rules managed by the first set of rules managers indicate message header changes to be performed by the first standardized simple switch application.

10. The network of claim 1, wherein the first set of rules managers manages the rules by at least one of changing, adding, removing or updating the rules in the first match-action table.

11. The network of claim 1, wherein the first set of rules managers manages the rules based on at least one of locally known information, subscribed information, requested information and change requests.

12. The network of claim 1, wherein the first standardized simple switch application is a function performed by a virtual machine operating on a respective one of the hardware components.

13. The network of claim 1, wherein the first standardized simple switch application is a hardware switch.

14. A method for provisioning multimedia delivery services, comprising:
 instantiating in computer hardware:
  match-action tables for storing rules, each match-action table comprising a first column defining a header edit instruction to be performed on a matching message, each match-action table further comprising a second column defining a forwarding instruction to be performed on the matching message;
  a plurality of standardized simple switch applications, each standardized simple switch application being the same as the other standardized simple switch applications of the plurality of simple switch applications, and each standardized simple switch application comprising:
    an interface for receiving the matching message;
    a function for editing the matching message in accordance with the header edit instruction defined in the first column of the match-action table and determining an identification information for a destination device of the matching message in accordance with the forwarding instruction defined in the second column of the match action table; and
    an interface for transmitting the matching message to the destination device according to the identification information; and
a plurality of rules managers for managing the rules;
operating a first standardized simple switch application of the plurality of standardized simple switch applications, a first match-action table of the plurality of match-action tables, and a first set of rules managers of the plurality of rules managers, to perform a first network function for application level message processing, whereby the first network function is performed by the first standardized simple switch application by performing the application level message processing according to the rules stored in the first match-action table and managed by the first set of rules managers; and
operating a second standardized simple switch application of the plurality of standardized simple switch applications, a second match-action table of the plurality of match-action tables, and a second set of rules managers of the plurality of rules managers, to perform a second network function for the application level message processing, the second network function being different from the first network function, whereby the second network function is performed by the second standardized simple switch application by performing the application level message processing according to the rules stored in the second match-action table and managed by the second set of rules managers.

15. The method of claim 14, wherein the first set of rules managers comprises:
a timing manager for handling dependencies between multiple transmitting attempts of the first standardized simple switch application.

16. The method of claim 15, wherein the timing manager includes a find user function comprising:
determining and prioritizing potential endpoints for the matching message; and
transmitting the matching message to the potential endpoints simultaneously or sequentially based on priorities of the potential endpoints.

17. The method of claim 14, wherein the first network function includes an originating service function comprising:
operation of a first state manager of the first set of rules managers to change rules based on a first service state;
operation of a lookup manager of the first set of rules managers to perform lookups to handle request uniform resource identifier routing; and
operation of the first standardized simple switch application to conduct transactions according to rule changes by the first state manager and according to lookups by the lookup manager.

18. The method of claim 17, wherein the second network function includes a terminating service function comprising:
operation of a second state manager of the second set of rules managers to change rules based on a second service state; and
operation of the second standardized simple switch application to conduct transactions according to rule changes by the second state manager.

19. The method of claim 14, wherein the rules managed by the first set of rules managers indicate message header changes to be performed by the first standardized simple switch application.

20. A computer-readable storage device having stored thereon computer readable instructions for provisioning multimedia delivery services, wherein execution of the computer readable instructions by a processor causes the processor to perform operations comprising:
instantiating a plurality of match-action tables for storing rules, each match-action table comprising a first column defining a header edit instruction to be performed on a matching message, each match-action table further comprising a second column defining a forwarding instruction to be performed on the matching message;
instantiating a plurality of standardized simple switch applications, each standardized simple switch application being the same as the other standardized simple switch applications of the plurality of standardized simple switch applications and each standardized simple switch application comprising:
    an interface for receiving the matching message;
    a function for editing the matching message in accordance with the header edit instruction defined in the first column of the match action table and determining an identification information for a destination device of the matching message in accordance with the forwarding instruction defined in the second column of the match action table; and
    an interface for transmitting the matching message to the destination device according to the identification information;
instantiating a plurality of rules managers for managing the rules;
operating a first standardized simple switch application of the plurality of standardized simple switch applications, a first match-action table of the plurality of match-action tables, and a first set of rules managers of the plurality of rules managers, to perform a first network function for application level message processing, whereby the first network function is performed by the first standardized simple switch application by performing the application level message processing according to the rules stored in the first match-action table and managed by the first set of rules managers; and
operating a second standardized simple switch application of the plurality of standardized simple switch applications, a second match-action table of the plurality of match-action tables, and a second set of rules managers of the plurality of rules managers, to perform a second network function for the application level message processing, the second network function being different from the first network function, whereby the second network function is performed by the second standardized simple switch application by performing the application level message processing according to the rules stored in the second match-action table and managed by the second set of rules managers.

* * * * *